United States Patent [19]
Thomas et al.

[11] Patent Number: 5,742,523
[45] Date of Patent: Apr. 21, 1998

[54] METHOD AND DEVICE FOR SUPPLYING GAS UNDER PRESSURE

[75] Inventors: Dominique Thomas, Le Creusot; Olivier Benrubi, Chalon Sur Saone, both of France

[73] Assignee: Seva, Chalon sur Saone, France

[21] Appl. No.: 363,221

[22] Filed: Dec. 23, 1994

[30] Foreign Application Priority Data

Dec. 24, 1993 [FR] France ........................... 93 15652

[51] Int. Cl.$^6$ ........................................ G01F 3/38
[52] U.S. Cl. .................. 364/558; 364/510; 73/1 G; 73/3
[58] Field of Search ........................ 364/510, 558, 364/497; 73/23.2, 865.01–865.1, 1 G, 3, 38; 137/113, 557, 7

[56] References Cited

U.S. PATENT DOCUMENTS

| | | | |
|---|---|---|---|
| 4,829,449 | 5/1989 | Polesnak | 364/510 |
| 5,220,515 | 6/1993 | Freerks | 364/510 |
| 5,411,685 | 5/1995 | Burgis | 264/40.5 |

Primary Examiner—Emanuel T. Voeltz
Assistant Examiner—Kamini S. Shah
Attorney, Agent, or Firm—Hazel & Thomas

[57] ABSTRACT

A device for delivering through a pipe a mass of a selected gas close to a selected predetermined mass value m, to a system at a predetermined working pressure P0 substantially greater than 100 bars according to the present invention incorporates a vessel of known volume V0, fitted with an inlet valve and with an outlet valve that is operatively connected to control passage through the pipe. A volume of a selected gas is injected into the vessel until a pressure of the gas in the vessel reaches a predetermined initial high pressure P1 with the initial high pressure P1 being greater than the working pressure P0. A temperature T of the gas in the vessel and the pressure of the gas in the vessel are measured, and a calculated pressure P2 is calculated using a formula:

$$P2 = P1 - \frac{mRT}{V0}$$

wherein the volume of the vessel is substantially greater than a volume of the mass m at the working pressure P0 and the initial high pressure P1 is greater than the working pressure P0. The measured temperature T and the calculated pressure P2 of the gas in the vessel are then stored in memory. The outlet valve is afterwards opened until the pressure of the gas in the vessel reaches the pressure P2 and for closing the outlet valve when the pressure P2 is reached. The temperature T of the gas in the vessel is maintained at a substantially constant value when the outlet valve is open.

14 Claims, 1 Drawing Sheet

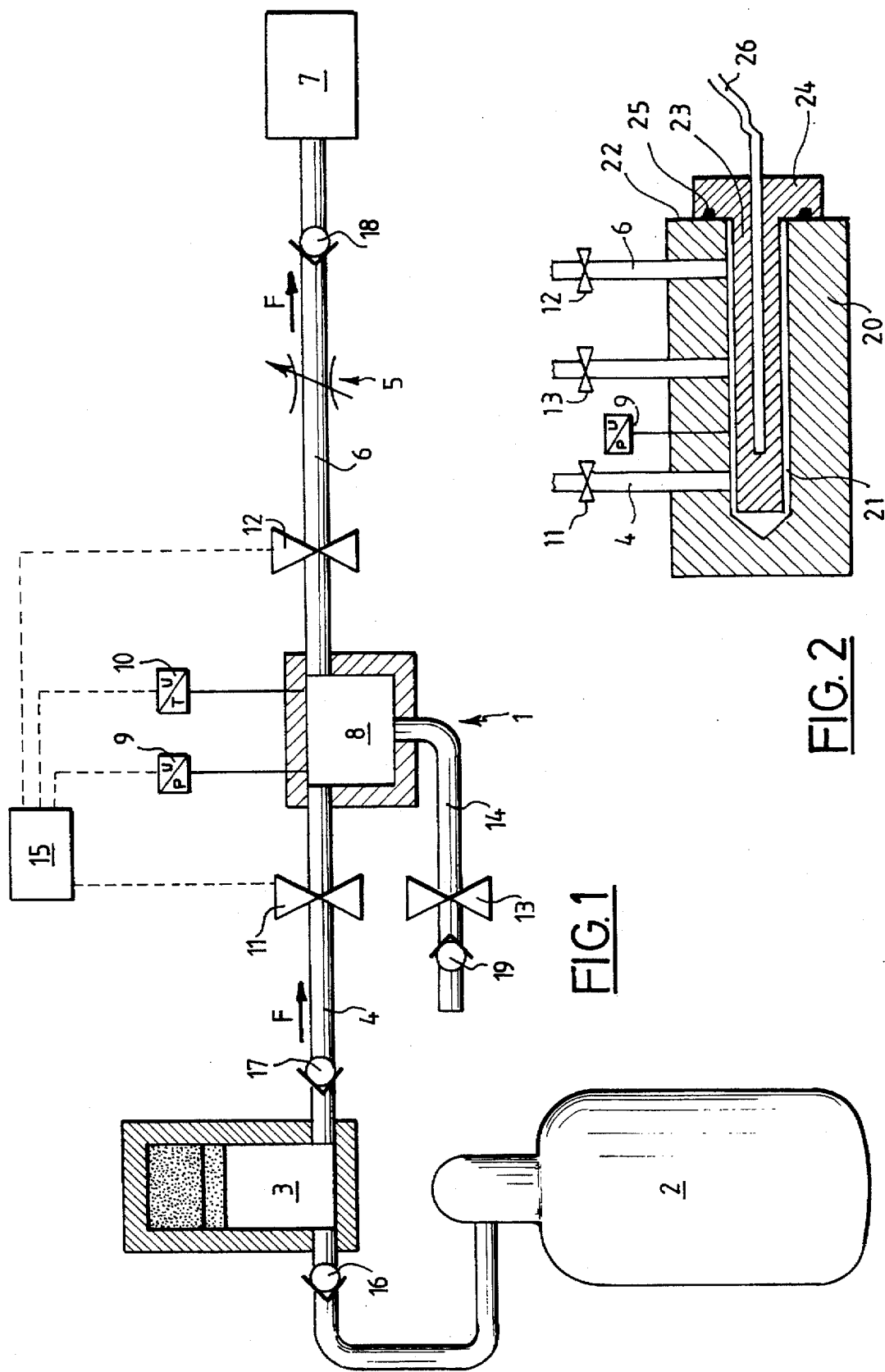

1

METHOD AND DEVICE FOR SUPPLYING GAS UNDER PRESSURE

BACKGROUND OF THE INVENTION

The present invention relates to a method and a device for delivering through a pipe a mass of gas close to a predetermined value m, at a pressure at least equal to a predetermined working pressure P0.

It applies, for example, to the injection of small quantities of nitrogen into a pressurized mixer fed with a viscous product such as a polymer.

In order to automatically meter small quantities of gas, typically of the order of one milliliter (standardized to 0° C. and 1 atm), raised to high-pressure, for example above approximately 250 bar, it is known to use mass flow meters.

The principal of such a mass flow meter consists of connecting onto a main gas-flow line a shunt which samples, for example, 10% of the gas. The temperature of the gas is measured at the inlet of the shunt, the gas in the shunt is then supplied with a known quantity of heat by Joule effect and, finally, the temperature of the gas at the outlet of the shunt is measured. Knowing the heat capacity of the gas, it is possible to calculate the mass of gas ejected from the line.

When it is desired to measure masses of gas whose pressure is very much greater than 100 bar, few instruments available on the market are usable, and this equipment is expensive.

SUMMARY OF THE INVENTION

The object of the invention is to provide a method and a device making it possible to economically supply small quantities of gas ejected at high pressures, greater than a predetermined working pressure.

For this purpose, the method according to the invention is characterized in that it comprises the following steps:

injecting gas into a vessel of known value V0 until a predetermined initial high pressure P1 is obtained which is markedly greater than the said working pressure P0, and closing this vessel;

measuring the temperature T of the gas within the vessel;

storing this temperature T in memory;

calculating a final mean pressure P2 using the formula:

$$P2 = P1 - \frac{mRT}{V0} ;$$

and ejecting a part of the gas by opening the vessel to the said pipe until the pressure of the gas contained in this vessel reaches the value P2.

In one embodiment, after the said injection, the initial high pressure P'1 actually reached is stored in memory; after the end of the injection, the value P'2 of the final mean pressure actually reached is stored in memory; and the mass M of gas actually ejected is calculated using the formula:

$$M = (P'1 - P'2) \times \frac{V0}{RT}$$

The method according to the invention may include one or more of the following characteristics:

the said predetermined working pressure P0 is very much greater than 100 bar;

the known volume V0 of the vessel is very much greater the the volume corresponding to the said predetermined mass m;

2 use is made of a vessel which forms a heat exchanger with the surroundings; and the vessel is combined with an external heat source.

A device intended for implementing such a method also forms the subject-matter of the invention. This device is characterized in that it comprises a vessel of known volume V0, fitted with an inlet valve end with an outlet valve; means for injecting the gas into the vessel until a predetermined initial high pressure P1 is obtained which is markedly greater than the said working pressure P0; means for measuring the temperature T and the pressure of the gas contained in the vessel; means for storing in memory the temperature T and the pressure of the gas and for calculating the pressure P2 using the formula:

$$P2 = P1 - \frac{mRT}{V0} ,$$

and means for opening the outlet valve until the pressure of the gas contained in this vessel reaches the value P2.

The device according to the invention may include one or more of the following characteristics:

the vessel forms a heat exchanger with the surroundings in order to keep the gases injected into the vessel at an approximately constant temperature T;

the vessel is combined with an external heat source;

the known volume V0 of the vessel is very much greater than the volume corresponding to the said predetermined mass m;

the vessel comprises means for varying its volume V0;

the vessel comprises a parallelepipedal block axially provided with a blind bore which accommodates an interchangeable finger with clearance;

a microthrottle valve is arranged downstream of the outlet valve in order to control the rate of ejection of the gas; and the vessel includes a drainage valve.

BRIEF DESCRIPTION OF THE DRAWINGS

An embodiment of the invention will now be described with reference to the attached drawings, in which:

FIG. 1 diagrammatically represents a device according to the invention to which a high-pressure gas source is connected upstream and an appliance using the ejected mass of gas is connected downstream; and FIG. 2 represents an embodiment of the vessel of the device in FIG. 1.

DETAILED DESCRIPTION OF THE PREFERRED EMBODIMENT

The metering device i represented in FIG. 1 is connected upstream to a bottle 2 containing, for example, nitrogen, via a hydropneumatic compressor 3 and a line 4. Downstream, the metering device 1 is connected to a microthrottle valve 5 by a line 6, in order to deliver a mass of gas close to a predetermined mass m to a user appliance V, for example a nitrogen/polymer mixer, at a pressure at least equal to a predetermined working pressure P0.

The metering device 1 comprises a vessel 8 to which a pressure sensor 9 and a temperature sensor 10 for the gas, an upstream shut-off solenoid valve 11, a downstream shut-off solenoid valve 12, a drain solenoid valve 13 mounted in a drain line 14 as well as memory-storage, computation and control means 15 are connected. The control means 15 is connected to the two solenoid valves 11 and 12 as well as to the pressure and temperature sensors 9 and 10.

The direction of flow of the gas is represented by the two arrows F, from the bottle 2 to the device 1 and from the latter to the appliance 7. The metering device 1 is, for this purpose, provided with non-return valves 16 to 18, respectively at the inlet and at the outlet of the compressor 3 and downstream of the valve 5, which non-return valves prevent the gas from flowing through the lines 4 and 6 in a direction opposite to that of the arrows F. It furthermore includes a non-return valve 19 which is located downstream of the valve 13 in the line 14 and which prevents external impurities from entering the vessel 8 via the drain valve 13.

An embodiment of the vessel 8 is now described with reference to FIG. 2. This vessel comprises a parallelepipedal metallic block 20 which has thick walls for the purpose of thermal homogenization. This block is axially pierced with a blind bore 21 which emerges on one of its end faces 22 and accommodates with clearance a removable thimble 23 carrying a head 24. This head 24 is wider than the diameter of the bore 21 and abuts against the face 22. This contact is made leaktight using a seal 25 inserted into a groove machined on the face of the head 24 abutting against the face 22 of the block 20. A thermocouple 26 is axially inserted into the finger 23. The lines 4 and 6 carrying the valves 11 and 12 emerge close to the two ends of the bore 21, respectively, by passing through the side wall of the block 20, whereas the drain line 14 emerges in the bore 21 between the two lines 4 and 6. The volume V0 of the vessel 8 is fixed by the length and the diameter of the finger 23 penetrating into the bore 21. It can be altered by replacing the finger 23 by another finger having different dimensions.

The operation of the metering device 1 is now described with reference to FIG. 1.

The vessel 8 has a volume V0 very much greater than the volume of the mass m of gas at the pressure P0. Thus, in order to deliver one milliliter (standardized to 0° C. and 1 atm) at at least 250 bar (P0), V0=7.5 cm³ may be chosen.

Initially, the vessel 8 is at a pressure P2 which is markedly greater, by approximately 20 bar, than the pressure P0, and the valves 11 and 12 are closed by the control means 15. The nitrogen bottle 2 containing the gas at a pressure of 20 bar delivers this gas to the hydropneumatic compressor 3 which supplies the nitrogen at a predetermined initial pressure P1 of approximately 300 bar into the line 4.

This predetermined initial high pressure P1 is in memory in the control means 15; it is markedly greater, by approximately 50 bar, than the pressure P0 at which the gas is used by the user appliance 7, and is such that, at this pressure, the vessel 8 contains a quantity of gas very much greater than m.

In order to start an operating cycle, the control means 15 opens the valve 11 with the valve 12 remaining closed. Nitrogen then fills the vessel 8 until the pressure P1 is reached and the valve 11 is then reclosed.

It should be noted that, during this injection of nitrogen into the vessel 8, the gas expands. However, this expansion occurs at practically constant temperature T by virtue of the structure of the vessel 8, which forms a heat exchanger with the surroundings (FIG. 2), also by virtue of the fact that the volume of gas ejected per cycle represents a very small fraction of the volume V0 of the vessel.

On the basis of the mass m of nitrogen to be ejected from the vessel 8 via the valve 12, the control means 15 calculates the final pressure P2 to be obtained in the vessel 8 after ejection, using the formula:

$$P2 = P1 - \frac{mRT}{V0}$$

where R is the ideal gas constant.

The gas is then ejected by causing the valve 12 to open using the control means 15. The pressure within the vessel 8 is then continuously measured and the valve 12 is again closed when this pressure reaches the value P2.

When the nitrogen is being ejected, the speed of the gas in the line 6 is controlled by the microthrottle valve 5. This valve is also useful for adjusting the gas ejection time so that the reaction times of the measuring appliances 9 and 10 as well as the technical operating times of the valve 12 are compatible with this ejection time.

The value M of the mass of gas actually ejected is recalculated by the control means 15 by storing in memory the initial high pressure P'1 actually reached as well as the value P'2 of the pressure P2 actually reached in the vessel 8 after ejection. The calculation formula used by the control means 15 is:

$$M = (P'1 - P'2) \times \frac{V0}{RT}$$

The drain valve 13 makes it possible to purge the vessel 8 when the device 1 is not being used, in order to prevent nitrogen from prematurely infiltrating into the downstream device 7 as a result of poor sealing of the valve 12 when it is closed.

We claim:

1. A method for delivering through a pipe a mass of a selected gas close to a selected predetermined mass value m, to a system at a predetermined working pressure P0 substantially greater than 100 bars, wherein said method comprises the following steps:

injecting a volume of said gas to be delivered into a vessel of known volume V0 until a pressure of said gas in said vessel reaches a predetermined initial high pressure P1, said initial high pressure P1 being greater than said working pressure P0, and closing said vessel, wherein said volume of said vessel is substantially greater than a volume of said mass m at said working pressure P0;

measuring a temperature T of said gas within said vessel;

storing said temperature T in memory;

calculating a final mean pressure P2 substantially greater than said working pressure P0 using a formula:

$$P2 = P1 - \frac{mRT}{V} ;$$

ejecting a said mass m of said gas by opening said vessel to said pipe until said pressure of said gas in said vessel reaches said pressure P2 while maintaining said temperature T of said gas within said vessel at a substantially constant value; and closing said vessel when said gas in said vessel has reached said calculated final mean pressure P2.

2. Method according to claim 1, characterized in that, after the said injection, the initial high pressure P'1 actually reached is stored in memory; after the end of the ejection, the value P'2 of the final mean pressure actually reached is stored in memory; and the mass M of gas actually ejected is calculated using the formula:

$$M = (P'1 - P'2) \times \frac{V0}{RT}$$

3. Method according to claim 1, characterized in that the said predetermined working pressure P0 is very much greater than 100 bar.

4. Method according to claim 1, characterized in that the known volume V0 of the vessel is very much greater than the volume corresponding to the said predetermined mass m.

5. Method according to claims 1, characterized in that use is made of a vessel which forms a heat exchanger with the surroundings.

6. Method according to claim 1, characterized in that the vessel is combined with an external heat source.

7. A device for delivering through a pipe a mass of a selected gas close to a selected predetermined mass value m, to a system at a predetermined working pressure P0 substantially greater than 100 bars, said device comprising:

a vessel of known volume V0, fitted with an inlet valve and with an outlet valve, said outlet valve operatively connected to control passage through said pipe;

means for injecting a volume of a selected gas into the vessel until a pressure of said gas in said vessel reaches a predetermined initial high pressure P1, said initial high pressure P1 being greater than said working pressure P0;

means for measuring a temperature T of said gas in said vessel and said pressure of said gas in said vessel;

means for calculating a calculated pressure P2 using a formula:

$$P2 = P1 - \frac{mRT}{V}$$

wherein said volume of said vessel is substantially greater than a volume of said mass m at said working pressure P0, said initial high pressure P1 being greater than said working pressure P0, said calculating means including means for storing in memory said measured temperature T and said calculated pressure P2 of the gas in said vessel;

means for opening said outlet valve until said pressure of the gas in said vessel reaches said pressure P2 and for closing said outlet valve when said pressure P2 is reached; and means for maintaining said temperature T of said gas in said vessel at a substantially constant value when said outlet valve is open.

8. Device according to claim 7, characterized in that the vessel forms a heat exchanger with the surroundings in order to keep the gases injected into the vessel at an approximately constant temperature T.

9. Device according to claim 7, characterized in that the vessel is combined with an external heat source.

10. Device according to claim 7, characterized in that the known volume V0 of the vessel is very much greater than the volume corresponding to the said predetermined mass m.

11. Device according to claim 7, characterized in that the vessel comprises means (23) for varying its volume V0.

12. Device according to claim 11, characterized in that the vessel comprises a parallelepipedal block axially provided with a blind bore which accommodates an interchangeable finger with clearance.

13. Device according to claim 7, characterized in that a microthrottle valve is arranged downstream of the outlet valve in order to control the rate of ejection of the gas.

14. Device according to claim 7, characterized in that the vessel includes a drainage valve.

* * * * *